United States Patent [19]
Mogilevsky et al.

[11] Patent Number: 5,536,525
[45] Date of Patent: Jul. 16, 1996

[54] METHOD FOR PREPARING AND PACKAGING A FROZEN INSTANT MASHED POTATO PRODUCT

[75] Inventors: Semyon Mogilevsky; David H. Scherpf; Shona H. Jonson, all of Omaha, Nebr.

[73] Assignee: Conagra, Inc., Omaha, Nebr.

[21] Appl. No.: 550,890

[22] Filed: Oct. 31, 1995

[51] Int. Cl.$^6$ .................................................. A23L 1/216
[52] U.S. Cl. ........................ 426/637; 426/393; 426/506; 426/519
[58] Field of Search ................................ 426/637, 393, 426/394, 506, 509, 519, 520

[56] References Cited

U.S. PATENT DOCUMENTS

| | | | |
|---|---|---|---|
| 2,802,742 | 8/1957 | Cooper | 426/637 |
| 4,005,139 | 1/1977 | Kortschot et al. | 426/550 |
| 4,060,998 | 12/1977 | Bernard | 426/515 |
| 4,574,690 | 3/1986 | Chiao et al. | 426/283 |

FOREIGN PATENT DOCUMENTS

| | | | |
|---|---|---|---|
| 730399 | 4/1980 | U.S.S.R. | 426/637 |
| 799710 | 2/1981 | U.S.S.R. | 426/637 |
| 833191 | 5/1981 | U.S.S.R. | 426/637 |
| 1329751 | 8/1987 | U.S.S.R. | 426/637 |
| 8303336 | 10/1983 | WIPO | 426/637 |

*Primary Examiner*—Arthur L. Corbin
*Attorney, Agent, or Firm*—Pretty, Schroeder, Brueggemann & Clark

[57] ABSTRACT

Disclosed is a method for the production of a frozen, instant mashed potato product for dispensing onto ovenable trays transported by a high-speed frozen food packaging line. A slurry including a fat-containing ingredient or a fat-substitute and water is heated to a temperature above the gelatinization temperature of potato starch but below the boiling point of the slurry. Next, the heated slurry is mixed with dehydrated potato solids using a combination of a high-speed mixing element and a low-speed scraping element both located inside a closed mixing chamber. Hydration of the potato solids is then completed under static conditions. The thus formed mashed potatoes are dispensed into an ovenable product container. The container is further packaged and the mashed potato products frozen.

21 Claims, 2 Drawing Sheets

5,536,525

METHOD FOR PREPARING AND PACKAGING A FROZEN INSTANT MASHED POTATO PRODUCT

BACKGROUND OF THE INVENTION

1. Field of the Invention

This invention relates to the preparation and packaging of foods. More particularly, it relates to the preparation and packaging of an instant mashed potato product in frozen meals.

2. Discussion of the Related Art

Frozen foods, foods packaged in containers that must only be heated before eating, have become extremely popular. Among the most popular foods are frozen meals -combinations of two or more different foods in a single container.

Frozen meals are typically made by preparing each individual food and, consequently, dispensing each food onto an ovenable tray, which is then further packaged and its contents frozen. It is a desideratum to fully prepare and cook each food before dispensing, so that the frozen foods must merely be reheated by the consumer. Control over the taste and other organoleptic properties of the meal is easier to maintain, if the consumer does not have to cook, but only has to reheat the foods.

Among the most popular foods to be included in frozen meals are instant mashed potato products. They are generally made using a batch process, where a single piece of equipment, typically, a low-speed, open-mixer is used for each batch cycle.

The instant mashed potato products are prepared by combining dehydrated potato solids, in the form of flakes or granules, with a slurry containing water, fat, milk, salt and other seasonings in the mixer. The resulting mixture is delivered to a dispensing unit, which feeds the mixture onto trays conveyed by a frozen meal packaging line. The trays then travel along the line to stations where they are sealed, inserted into cartons and their contents frozen.

This conventional process suffers from several drawbacks. For example, room temperature or chilled water is used to make the slurry. Therefore, the temperature of the potato solid/slurry mixture is far below the gelatinization temperature of potato starch (140°–149° F.). It is not until the mixture is heated by the consumer that the instant mashed potatoes are cooked. Even then, however, due to the adverse effect of freezing on the potato solid/slurry mixture, complete hydration of the potato solids does not occur, so that high quality instant mashed potatoes cannot be prepared.

Another shortcoming of the conventional process arises because of its use of open-mixers. A common characteristic of open mixers is the relatively slow movement of their mixing elements (only about 25–60 rpm). The consequence of slow mixing is the substantial mix time of the total batch cycle needed to achieve a mixture free of lumps.

Such a prolonged mechanical treatment of the potato solids ruptures membranes of the potato cells, particularly the fragile cells of dehydrated potato flakes. Membrane breakage results in water leaching out of the cells and leads to a loss of the mashed potatoes' characteristic mealy texture.

A further disadvantage of the slow batch cycle is that a single, open mixer cannot be used efficiently with modern, high-speed, food packaging lines. It is not unusual for such lines to convey trays at the rate of 250–300 trays per minute. Consequently, it is also a desideratum to develop a batch process having a quick cycle time that can be easily integrated into high-speed food packaging lines.

Accordingly, there has existed a definite need for a process for preparing and packaging a frozen, instant mashed potato product having essentially the same flavor and texture as mashed potatoes prepared from fresh-cooked potatoes. There has existed a further need for a process that completely prepares and cooks the mashed potato product prior to packaging, so that the potatoes need merely be reheated by the consumer. There has existed a still further need for a method for preparing a mashed potato product from dehydrated potato solids that minimizes the mechanical treatment of the potato solids and maximizes the mealy character of the mashed potato product. There has existed a still further need for a method for preparing a mashed potato product that can be used with high-speed frozen meal packaging lines. The method in accordance with the present process satisfies these and other needs and provides further related advantages.

SUMMARY OF THE INVENTION

Now in accordance with the invention, there has been found an improved method for the production of a frozen, instant mashed potato product for dispensing onto ovenable trays transported by a high-speed frozen food packaging line. A slurry including a fat-containing ingredient or a fat-substitute, water, and optionally milk and/or seasonings is heated to a temperature above the gelatinization temperature of potato starch, but below the boiling point of the slurry. Next, the heated slurry is mixed with dehydrated potato solids using a combination of a high-speed mixing element and a low-speed scraping element both located inside a closed mixing chamber. The thus formed mashed potatoes are then dispensed into a product container. The container is further packaged, and the mashed potato product frozen.

In some embodiments, the slurry is formed by combining from about 0.5 wt % to about 10 wt % butter, margarine, fat-substitute or combinations thereof, from about 0 wt % to about 30 wt % liquid milk, from about 0 wt % to about 3 wt % dry milk cream, from about 0 wt % to about 8 wt % seasonings, and from about 50 wt % to about 85 wt % water in a high-speed, open mixer and heating to a temperature in the range of about 170° to about 190° F. The heated slurry is then mixed with from about 13 wt % to about 19 wt % dehydrated potato flakes, potato granules or mixtures thereof in a high-speed closed mixer-processor having first and second horizontally-mounted and independently-driven mixing elements, where the first mixing element is an off-center-mounted, high-speed mixing element and the second mixing element is a center-mounted, low-speed scraping element mixer that rotates in a direction opposite from the direction of rotation of the first mixing element.

Also in some embodiments, the slurry is heated by recycling between the high-speed, open mixer and a continuous heater; the heated slurry is stored prior to mixing with the dehydrated potatoes; and the mashed potatoes are transported at the potatoes' gelatinization temperature from the mixer-processor to a device for dispensing the mashed potatoes.

DETAILED DESCRIPTION OF THE PREFERRED EMBODIMENTS

Figure 1:
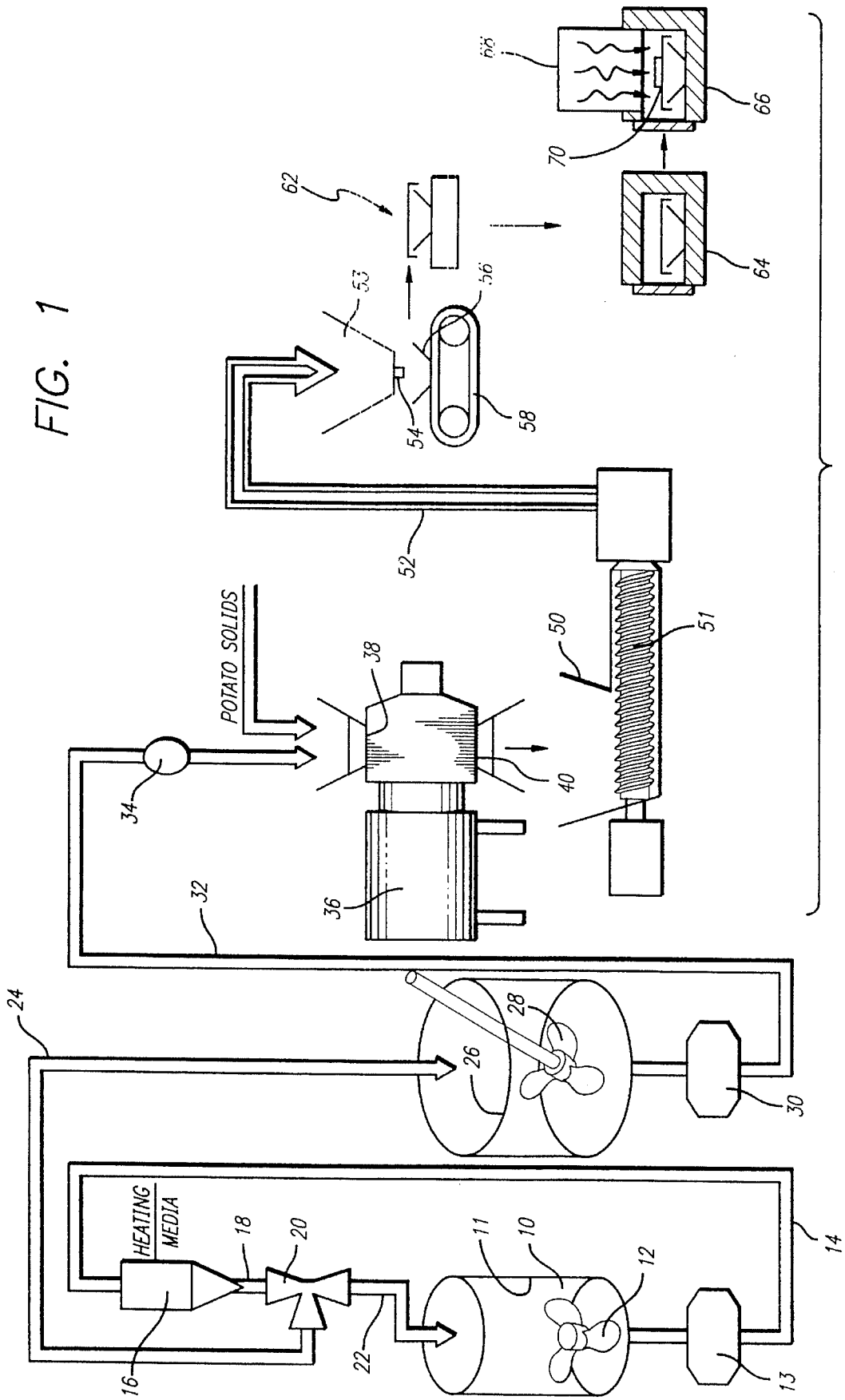
FIG. 1 is a schematic diagram illustrating an instant mashed potato preparation and packaging system used in accordance with the inventive method.

The instant mashed potatoes prepared in accordance with the inventive method are made from about 13 wt % to about 19 wt %, preferably, from about 15 wt % to about 17 wt %, dehydrated potato solids; from about 0.5 wt % to about 10 wt %, preferably, from about 0.5 wt % to about 7 wt %, of a fat-containing ingredient or a fat-substitute; from about 0 wt % to about 30 wt %, preferably, from about 9 wt % to about 24 wt %, liquid milk; from about 0 wt % to about 3 wt %, preferably, from about 0.4 wt % to about 1.2 wt %, dry milk cream; from about 0 wt % to about 8 wt %, preferably, from about 0.2 wt % to about 5.5 wt %, seasonings; and from about 50 wt % to about 85 wt %, preferably, from about 50.5 wt % to about 70 wt %, water; where all weight percentages are based on the total weight of the final product.

Dehydrated potato solids useful in accordance with the invention are known and include dehydrated solids obtained from cooked and dried potatoes. Dehydrated solids obtained from russet or similar high-solid variety potatoes are preferred. The use of dehydrated potato solids eliminates the long processing time associated with cooking fresh potatoes and reduces the cooking time to a short period equal to the water absorption or hydration time of the dehydrated solids.

The dehydrated potato solids can be of any suitable form, including flake and granular potato solids. When processing fresh potatoes into flakes and granules, different technologies are used. These variations in processing cause flakes and granules to function differently, especially during hydration. Flakes contribute to a fresh potato flavor, while granules contribute to a mealy texture.

It is an advantage of the method in accordance with the invention that when combinations of potato flakes and potato granules are used the resulting mashed potato product has essentially the same flavor and texture as mashed potatoes prepared from fresh cooked potatoes. In preferred embodiments, the ratio of flakes to granules is from about 55:45 to about 70:30, more preferably about 60:40.

Representative fat-containing ingredients include butter or margarine. When a low-fat potato product is desired, all or part of the fat-containing ingredient can be replaced with a fat-substitute. The fat-containing ingredient and/or fat-substitute is added in an amount sufficient to impart a desired richness, creaminess and flavor to the instant mashed potato product.

Milk is included as a powder, a liquid or combination thereof. When the milk is added as a liquid, the amount of water is reduced by an appropriate amount. Milk is used in an amount sufficient to impart a desired richness and texture. In some embodiments, it is desirable to use skim milk in order to reduce the fat content of the mashed potato product.

Various seasonings or flavorings such as salt and spices are added for their flavor-enhancing qualities. The precise amounts of the fat-containing ingredient or fat-substitute, milk and seasonings will depend upon the particular flavor and textural properties desired for a particular product. The amounts will be readily determinable by one skilled in the art without undue experimentation.

Turning now to FIG. 1, there is shown a schematic diagram of a batch system for preparing and packaging mashed potatoes in accordance with the inventive method. In a batch process, the efficient distribution of all the ingredients, especially the fat-containing and flavoring ingredients, is important. It is another advantage of the method in accordance with the invention that the fat-containing and flavoring ingredients are effectively dispersed throughout the slurry, prior to mixing with the potato solids. This assures a consistent distribution of fat-containing and flavoring ingredients in each given volume of the mixture of potato solids and slurry and, therefore, in the final, packaged product.

In the first step, the fat-containing ingredient or fat-substitute, the milk and, optionally, the seasonings, are combined with hot water and blended in an open mixer 10. The open mixer defines a mixing chamber 11 having a horizontally-oriented, high-speed agitator 12 located at its bottom. Suitable high-speed, open mixers are manufactured by Breddo Co., APV Crepaco, Inc., and Silverson Co.

The ingredients are combined in the mixer 10 and blended at high-speed, e.g., at about 1800 rpm, for a time sufficient to form a slurry. To facilitate the mixing of a solid or liquid ingredient, such as butter or margarine, that has been refrigerated, about one-third the total amount of water to be added, heated to a temperature of about 150°–160° F., is initially added to the ingredient. After mixing for about one to two minutes, the remainder of the water, at ambient temperature, is added. All the ingredients are then mixed for an additional thirty to sixty seconds to form the slurry.

A pump 13 then delivers the slurry through piping 14 into a continuous heater 16. The slurry exits the continuous heater through piping 18 and passes to a diverter valve 20. The diverter valve is positioned to recycle the slurry through piping 22 back to the mixer 10 and then back into the heater. The recycling continues until the slurry is heated to a temperature above the gelatinization temperature of potato starch, but below the boiling point of the slurry. Preferred temperatures range from about 170° to about 190° F., with temperatures of about 180° F. being most preferred. To maintain the high-efficiency production required to complement high-speed packaging lines, the recycling time for reaching the desired temperature should not exceed about 30–45 seconds.

Once the slurry reaches the desired temperature, the diverter valve 20 is repositioned and the hot slurry allowed to pass from the valve through piping 24 into a jacketed, storage tank 26 equipped with a mixing element 28. A controlled heating media, such as steam, is introduced into the jacket to maintain the slurry at a temperature in the range of from about 170° to about 190° F., preferably about 180° F. The hot slurry can be stored for a predetermined time in the storage tank, under agitation.

When it is desired to complete the preparation of the mashed potatoes, a pump 30 delivers the hot slurry through piping 32 to a flow meter 34. The meter then introduces a predetermined amount of the hot slurry into a closed mixer-processor 36. At the same time, a predetermined amount of dehydrated potato solids is added to the mixer-processor. The relative amounts of slurry to potato solids combined in the mixer-processor preferably ranges from about 81 wt % to about 87 wt % slurry and from about 13 wt % to about 19 wt % potato solids, more preferably from about 83 wt % to about 85 wt % slurry and about 15 wt % to about 17 wt % potato solids.

Figure 2:
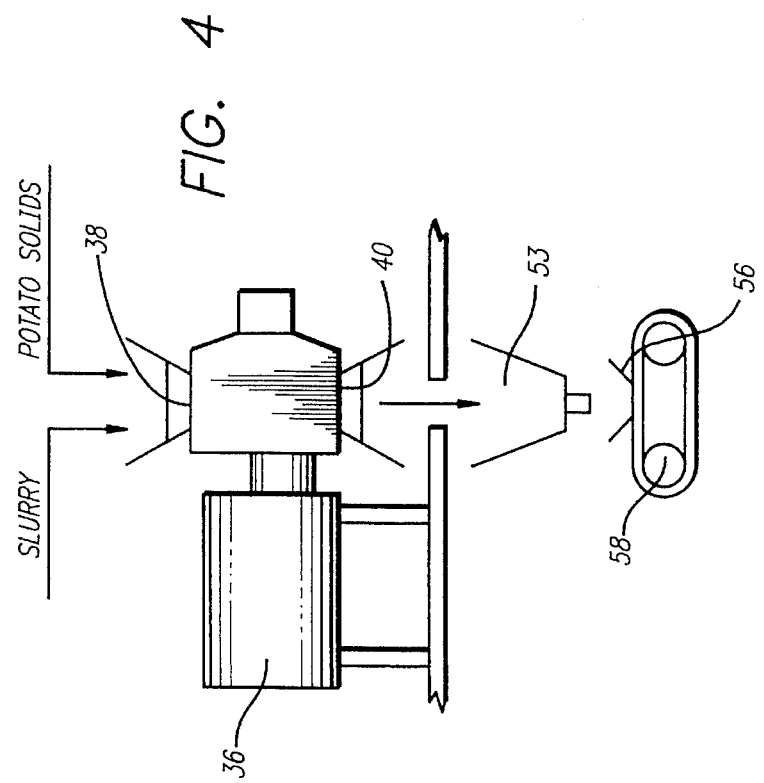
FIG. 2 is a partially cut-away view illustrating a portion of a mixer-processor used in the method in accordance with the inventive method.

A suitable mixer-processor is a Model TK 160 mixer, manufactured by A. Stephan & Sons, GmbH, Germany. As best seen in FIG. 2, the mixer-processor has an inlet port 38 and an exit port 40. Access to each port is controlled by sliding doors 42 and 44, respectively. Initially, the sliding doors are positioned with the inlet port open and the outlet port closed, so that the slurry and the potato solids can be introduced into the mixer-processor 36.

The sliding door 42 is then closed and the slurry and potato solids are rapidly mixed using a pair of horizontally-mounted and independently-driven mixing elements. The first mixing element 46 is an off-center-mounted, high-speed mixing element. It rotates at a speed of from about 900 to about 1600 rpm, preferably of from about 1000 to about 1400 rpm, more preferably about 1200 rpm. The high-speed mixing element produces a quick and thorough distribution of the slurry throughout the potato solids. Additionally, by employing the high-speed mixing element each dehydrated potato cell is provided with the amount of water required to restore the cell to its original, hydrated size and shape.

The second mixing element 48, driven by motor 49, is a center-mounted, low-speed scraping mixing element. It rotates in the opposite direction from the first element at a speed of from about 20 to about 40 rpm, more preferably from about 25 to about 30 rpm. By rotating in the opposite direction, the low-speed scraping mixing element assists the mixing process as it folds product that accumulates on the inner wall of the mixer back into the mixer's interior.

The ingredients are mixed for a period of from about ten to about sixty seconds to combine the ingredients and produce a mixture without any lumps of non-wetted potato solids. Once the mixing stops, the mixture sets in the mixer-processor for a minimum of about one to about three minutes, to complete the hydration of the potato solids under static conditions. It is believed that this combination of conditions enhances and accelerates the water absorption of the potato starch cells at the gelatinization temperature of the potato starch.

Once the potato solids have hydrated and the mashed potatoes are formed, the sliding door 44 is opened to discharge the mashed potatoes to be delivered to a high speed, frozen food packaging line. In some embodiments, the amount of the slurry and potato solids delivered to the mixer-processor, the time of mixing, the time of hydration, and the sequence of opening/closing the mixer's sliding doors is synchronized through a built-in programmable logic controller (not shown). In the embodiment shown in FIG. 1, the mashed potatoes are initially gravity-fed into a hopper 50 of a positive displacement pump 51. The mashed potatoes are then transferred through a double-walled piping 52 into a hopper 53 of a dispensing unit 54. The dispensing unit is timed to discharge the mashed potatoes onto ovenable meal trays 56 (only one illustrated) transported along a high-speed packaging conveyor 58.

Figure 3:
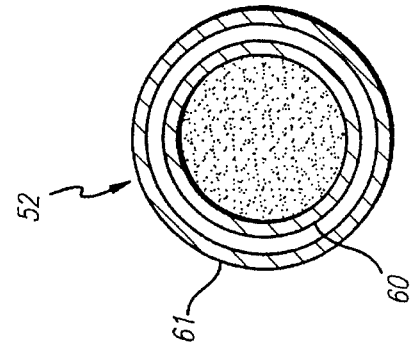
FIG. 3 is a cross-sectional view of piping used to transport instant mashed potatoes to a frozen food packaging line.

FIG. 3 shows a cross-section of the double-walled piping 52 having an inner wall 60 and an outer wall 61. It is a feature of the method in accordance with the invention that the fluidity of the mashed potatoes passing through the pipe is maintained. This is accomplished by circulating a heating media, such as hot water having a temperature Of from about 150° to about 155° F., between the two walls, in order to maintain the temperature of the mashed potatoes at about 140°–149° F, i.e., at the gelatinization temperature of the mashed potatoes.

Figure 4:
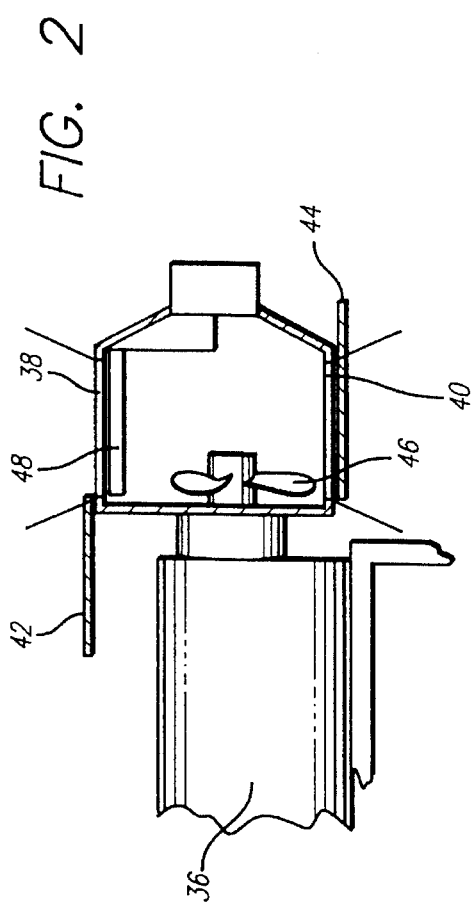
FIG. 4 is an illustration of an alternative embodiment of a portion of the preparation and packaging system used in accordance with the inventive method.

In the alternative embodiment shown in FIG. 4, the mashed potatoes are simply gravity-fed from the exit port 40 directly to the hopper 53 of dispensing unit. Returning to FIG. 1, after being filled from the dispensing unit 54, the trays 56 are carried along the conveyor 58 to a station 62 where the trays are sealed with plastic or metal foil, on to a station 64 where the sealed trays are inserted into cartons, and then on to a station 66 where a meal with the thus produced mashed potatoes is frozen.

The following example is included to further illustrate the invention. It is not a limitation thereon.

EXAMPLE

Instant mashed potatoes were prepared from the following ingredients:

| Ingredients | % | lb. |
|---|---|---|
| Water | 75.66 | 136.19 |
| Potato flakes | 9.00 | 16.20 |
| Margarine | 7.00 | 12.60 |
| Potato granules | 6.00 | 10.80 |
| Whole dried milk | 1.64 | 2.95 |
| Salt | 0.68 | 1.22 |
| White pepper | 0.02 | 0.04 |
| Total | 100.00% | 180.00 lb. |

Into an open mixer (manufactured by Breddo Co.) was introduced 40.86 pounds of water having a temperature of 150° F. To the water was added 12.6 pounds of margarine and the water and margarine were mixed for 60 seconds using a bottom agitator rotating at 1800 rpm. The mixer was stopped and the remaining 95.38 pounds of water, this time at ambient temperature, was added. The mixer was restarted and 2.95 pounds of whole dried milk, 1.22 pounds of salt and 0.04 pounds of pepper were added and all the ingredients were mixed for 30 seconds. The mixer was stopped and the milk allowed to hydrate for 3–4 minutes to form a slurry.

The mixer was restarted and the slurry mixed for 10–15 seconds, then recirculated between the open mixer and a continuous heater. After reaching a temperature of 180° F., the slurry was transferred to a holding tank. The slurry was maintained at this elevated temperature, while several more batches of slurries were prepared by the same procedure and added to the holding tank.

Next, 153 pounds of hot slurry were transferred to a mixer-processor (Model TK 160, manufactured by A. Stephan & Sons, GmbH). At the same time, 16.20 pounds of potato flakes and 10.80 pounds potato granules were introduced into the mixer-processor. The slurry and the potato solids were then rapidly mixed using a combination of a high-speed mixing element rotating at 1200 rpm and a lowspeed scraping element rotating at 27 rpm in the direction opposite the direction of rotation of the high-speed mixing element. The ingredients were mixed for ten seconds and the mixer-processor stopped. The resulting mixture then set in the mixer-processor for one minute under static conditions to complete the hydration of the potato solids.

The resulting mashed potatoes were then gravity fed into the hopper of a positive displacement pump (manufactured by Robbins & Myers) which caused the mashed potatoes to be transported through double-walled piping to a dispensing unit. The fluidity of the mashed potatoes passing through the piping was maintained by circulating water having a temperature of 150°–155° F. between the double walls.

The mashed potatoes were dispensed onto ovenable trays, which were then sealed, packaged into cartons and frozen.

The method in accordance with the invention provides significant advantages over conventional methods including a substantial reduction in the time for each batch cycle, i.e., the time required to load the slurry and the potato solids into the mixer-processor, to mix them together, to hydrate the potato solids, and then to discharge the finished mashed potatoes. When the high speed mixer-processor is combined with high-speed slurry preparation and rapid discharge, a batch cycle can be accomplished in five to seven minutes. In practical terms, this means that a single mixer-processor can make mashed potatoes at a rate quick enough to support a high speed packaging line of 250–300 meals per minute.

While the invention has been described in detail with reference to certain preferred embodiments thereof, it will be understood that modifications and variations are within the spirit and scope of that which is described and claimed.

We claim:

1. A method for preparing and packaging a frozen, instant mashed potato product comprising the steps of:

heating a slurry containing a fat-containing ingredient or a fat-substitute and water to a temperature above the gelatinization temperature of potato starch, but below the boiling point of the slurry;

mixing the heated slurry with dehydrated potato solids using a high-speed mixer-processor to form an instant mashed potato product; and dispensing the thus formed instant mashed potato product into an ovenable container; sealing the container; and then freezing its contents.

2. The method in accordance with claim 1 wherein the fat-containing ingredient is butter, margarine, or combinations thereof.

3. The method in accordance with claim 1 wherein the slurry is heated to a temperature in the range of about 170° to about 190° F.

4. The method in accordance with claim 1 wherein the water and fat-containing ingredient are combined to form the slurry in a high-speed mixer.

5. The method in accordance with claim 4 wherein the slurry is heated by recycling the slurry between the high speed mixer and a continuous heater.

6. The method in accordance with claim 1 further comprising storing the heated slurry prior to mixing with the dehydrated potato solids.

7. The method in accordance with claim 1 wherein the dehydrated potato solids are selected from potato flakes, potato granules and mixtures thereof.

8. The method in accordance with claim 7 wherein the potato solids comprises a mixture of flakes and granules in a ratio of flakes to granules of from about 55:45 to about 70:30.

9. The method in accordance with claim 1 wherein the high speed mixer-processor comprises first and second horizontally-mounted and independently-driven mixing elements, the first mixing element being an off-center-mounted, high-speed mixing element and the second mixing element being a center-mounted, low-speed scraping mixing element that rotates in a direction opposite from the direction of rotation of the first mixing element.

10. The method in accordance with claim 1 further comprising completing hydration of the potato solids under static conditions, after mixing and before dispensing the mixture into the product container.

11. The method in accordance with claim 1 further comprising transporting the instant mashed potato product at the potato starch gelatinization temperature from the mixer-processor to a device for dispensing the instant mashed potato product.

12. A method for preparing and packaging a frozen, instant mashed potato product comprising the steps of:

combining from about 0.5 wt % to about 10 wt % butter, margarine, fat-substitute or combinations thereof, from about 0 wt % to about 30 wt % liquid milk, from about 0 wt % to about 3 wt % dry milk cream, from about 0 wt % to about 8 wt % seasonings, and from about 50 wt % to about 85 wt % water, where all weight percentages are based on the total weight of the final product, in a high-speed, open mixer to form a slurry;

heating the slurry to a temperature above the gelatinization temperature of potato starch, but below the boiling point of the slurry;

mixing the heated slurry with from about 13 wt % to about 19 wt % dehydrated potato flakes, potato granules or mixtures thereof in a mixer-processor with a high speed mixing element;

completing hydration of the dehydrated potato solids under static conditions to form an instant mashed potato product; and dispensing the thus formed instant mashed potato product into an ovenable container; sealing the container; and then freezing its contents.

13. The method in accordance with claim 12 wherein the slurry is heated to a temperature in the range of about 170° to about 190° F.

14. The method in accordance with claim 13 wherein the slurry is heated by recycling the slurry between the high-speed, open mixer and a continuous heater.

15. The method in accordance with claim 13 wherein the high speed mixer-processor comprises first and second horizontally-mounted and independently-driven mixing elements, the first mixing element being an off-center-mounted, high-speed mixing element and the second mixing element being a center-mounted, low-speed scraping mixing element that rotates in a direction opposite from the direction of rotation of the first mixing element.

16. The method in accordance with claim 13 further comprising transporting the instant mashed potato product at the potato starch gelatinization temperature from the mixer-processor to a device for dispensing the instant mashed potato product.

17. The method in accordance with claim 12 wherein the slurry is heated by recycling the slurry between the high-speed, open mixer and a continuous heater.

18. The method in accordance with claim 12 further comprising storing the heated slurry prior to mixing with the dehydrated potatoes.

19. The method in accordance with claim 12 wherein the potato solids comprises a mixture of flakes and granules in a ratio of flakes to granules of from about 55:45 to about 70:30.

20. The method in accordance with claim 12 wherein the high speed mixer-processor comprises first and second horizontally-mounted and independently-driven mixing elements, the first mixing element being an off-center-mounted, high-speed mixing element and the second mixing element being a center-mounted, low-speed scraping-mixing element that rotates in a direction opposite from the direction of rotation of the first mixing element.

21. The method in accordance with claim 12 further comprising transporting the instant mashed potato product at the potato starch gelatinization temperature from the mixer-processor to a device for dispensing the instant mashed potato product.

* * * * *